July 10, 1962  J. G. COULOURIOTES  3,043,135
TEST FIXTURE
Filed May 29, 1959

JAMES G. COULOURIOTES
INVENTOR.

BY *Alden D. Redfield*
*Abraham Ogman*
ATTORNEYS

ന്ന
3,043,135
TEST FIXTURE
James G. Coulouriotes, North Wilmington, Mass., assignor to Avco Corporation, Cincinnati, Ohio, a corporation of Delaware
Filed May 29, 1959, Ser. No. 816,853
6 Claims. (Cl. 73—103)

This invention relates to a test fixture for use with environmental test equipment, notably vibration, shock and acceleration equipment. Environmental condition and environmental force, as used herein, are synonymous.

One of the most difficult problems associated with vibration, shock, and acceleration testing of components, is the design of a test fixture which will convey only the environment to the test specimen mounted on the test fixture. Many failures of test components subjected to an environmental test have been attributed to inadequate control of the environment resulting from improperly designed test fixtures.

In order to transfer a desired environment to a test component, without an intermediate amplification of the environment, the test fixture must be a rigid structural member between the test equipment, which generates the desired environment, and the mounting points of the test components. In effect, the test fixture must act as an integral part of the environmental test equipment.

In addition to the requirement that the test environment be faithfully transferred to the test component by the test fixture, the test fixture must be so constructed that it will not introduce spurious moments into the test component that will affect the reliability of the test program, as by causing a premature or an unexplainable failure.

It is an object of the present invention to provide a test fixture for transferring an environmental condition applied to it from a test equipment to a test component mounted thereto without amplifying the environmental condition.

It is an object of the present invention to provide a test fixture for transferring an environmental condition applied to it from a test equipment to a test component mounted thereto without introducing spurious moments which may cause a premature failure of the test component.

It is another object of the invention to provide a test fixture for transferring an environmental condition applied to it by an environmental test equipment to a component secured to it wherein the center of gravity of the test fixture is spaced, by a predetermined amount, from the center of pressure of the applied environmental condition, the latter being the point of application at which the sum of the applied moments equals zero. When the test component is secured to the test fixture the center of gravity of the combination of the test fixture and the test component can be made co-linear with the center of pressure, or lie within a predetermined distance from it, thus eliminating or minimizing spurious moments.

Other objects of the invention are to provide a test fixture for transferring an environmental condition to a test component which:

(1) Provides standardization of test fixtures for vibration exciters, shock machines and acceleration machines.

(2) Becomes an integral part of the environmental test equipment.

(3) Permits testing of components in each of three mutually perpendicular planes by simply reorienting the test specimen on the test fixture to change its axis, and (4) Provides a versatile test specimen mounting.

A preferred embodiment of a test fixture for transferring an environmental condition applied to it by an environmental test equipment to a component secured to the test fixture comprises a unitary body having a center of gravity, a surface for receiving the applied environmental condition including a base surface center of gravity, and recess means defined therein. The body is adapted to be secured to an environmental test equipment for receiving an applied environmental condition. The center of pressure of the applied environmental condition acts on the surface center of gravity which is spaced from the center of gravity of the test fixture, but the centers lie in a median plane parallel to the direction of the applied environment. The recess is defined by a mounting surface having means for securing a test specimen to the test fixture. It is symmetrical with respect to the aforementioned plane. The mounting surface is located, with repect to the center of gravity, on the same side of the test fixture as the base surface center of gravity. Thus, when a test component is mounted to the mounting surface there is formed a combined center of gravity of the combination of the test fixture and the test component which ideally, can be made to coincide or overlie the center of pressure. Ideally, therefore, the sum of the moments about the combined center of gravity can be made to equal zero. As a practical matter, however, it will be shown that the effect of a moment about the combined center of gravity can be neglected provided the combined center of gravity is within a predetermined distance from the center of pressure.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
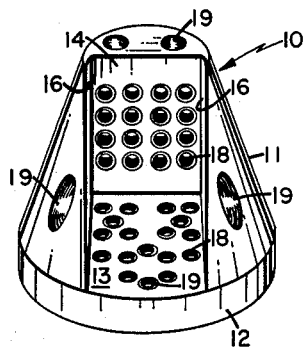
FIGURE 1 is a front pictorial representation of a test fixture embodying the principles of the invention.
Figure 2:
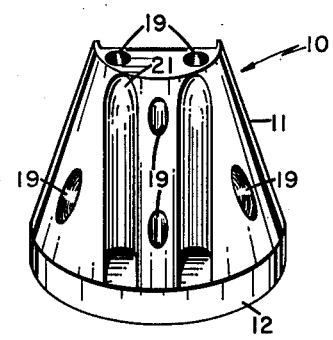
FIGURE 2 is a rear pictorial of the FIGURE 1 test fixture.

Referring to FIGURES 1 and 2 of the drawings there is represented a pictorial drawing of a test fixture embodying the principles of the present invention. The test fixture designated 10, comprises a frusto-conical portion 11 extending integrally from a cylindrical base portion 12. Preferably, the test fixture comprises a magnesium casting, although beryllium can also be used. Magnesium represents a compromise based on performance and manufacturing costs. A beryllium fixture will perform substantially better because beryllium has a higher modulus of elasticity to density ratio than magnesium, thus providing a stiffer structure and a higher natural resonant frequency. Since amplification occurs at resonance, the useful operating range of the test fixture is proportional to the modulus of elasticity to density ratio of the material used in the fixture.

The test fixture 10 has two mutually perpendicular mounting surfaces 13 and 14. The mounting surface 13 extends horizontally from the outside periphery of the test fixture 10 towards the center. It is substantially rectangular in shape and, in the absence of the conical portion 11 would form part of the top surface of the cylindrical portion 12. The mounting surface 14 extends vertically from the mounting surface 13 and is situated behind the centerline of the test fixture 10. More will be said of the location of the vertical mounting surface 14 hereinafter. The mounting surfaces 13 and 14 comprise a recess within the test fixture 10. The remaining portions of the conical portion 11 act to brace the vertical mounting surface in the front and rear to minimize any bending effects when test components are vibrated. The front bracing members are designated 16 in FIGURE 1.

Use of a vertical and horizontal mounting surface provides means for testing a component in any one or all of the three orthogonal directions specified in standard vibration, acceleration or shock specifications. The component mounting means on the mounting surfaces 13 and 14 comprise hardened steel threaded inserts 18 embedded behind and opening in the surfaces as shown in FIGURE 1. The inserts are symmetrically distributed in the mounting surfaces 13 and 14 assuring uniform transfer of the environmental condition to the test component and without the introduction of moments.

The test fixture 10 also includes means for mounting the fixture to an environmental test equipment, such as a shock or vibration machine. These means comprise a plurality of counterbored passages 19 located in the conical and base portions 11 and 12 respectively. The counterbored apertures 19 are distributed about the periphery and in the center of the test fixture in order that the test fixture can be securely attached to the test equipment in a plurality of places across its entire cross section.

A pair of slots 21, defined in the conical portion 11 at the rear of the vertical mounting surface 14, are provided for locating the center of gravity of the test fixture at a predetermined point. In accordance with this invention the center of gravity of the test fixture will not be in the same vertical plane as the geometrical center of the cylindrical base portion 12. The reason for displacing the center of gravity from the geometrical center will be outlined hereinafter. The position of the center of gravity in relation to the vertical mounting surface 14 along a plane perpendicular to the vertical mounting surface 14 can be set by judiciously selecting the volume of material removed from the conical portion 11 when constructing the slots 21.

The specific shape of the test fixture 10, shown in FIGURE 1 and described above, was tested and found to perform extremely well. To illustrate, the parameters for a test fixture 10 designed for testing components up to six pounds are as follows:

(1) The diameter of the cylindrical base 12 _____ 9¼ inches.
(2) The height of the cylindrical base 12 _____ 1¼ inches.
(3) The small diameter of conical portion 11 _____ 6 inches.
(4) The height of the conical portion 11 _____ 6 inches.
(5) Horizontal mounting surface 13 6×4½ inches.
(6) Vertical mounting surface 16 __ 6 inches×6 inches.
(7) Lateral displacement of vertical mounting surface from the geometric center of the cylindrical portion 12 _____ ⅜ inch.
(8) Lateral displacement of the center of gravity from the geometric center of the cylindrical portion 12 _____ ⅝ inch.

Figure 3:
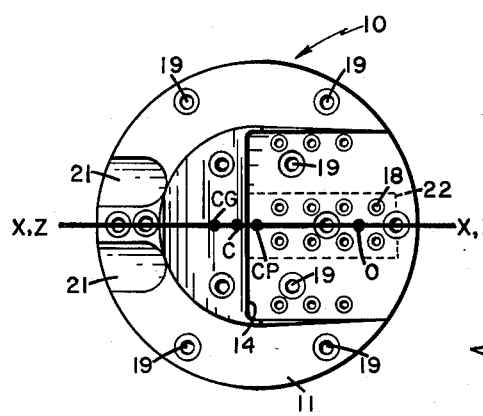
FIGURE 3 is a top view of the FIGURE 1 test fixture.
Figure 4:
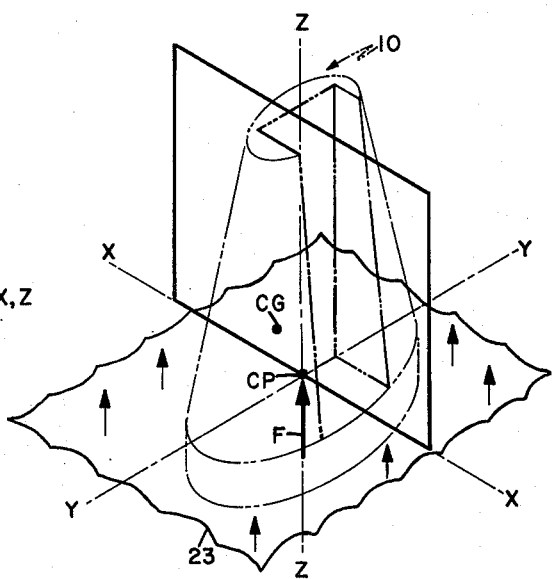
FIGURE 4 is a three dimensional outline useful in describing the invention.

In FIGURE 3 of the drawings, there is represented a top view of the test fixture 10 and in FIGURE 4 of the drawings there is represented a schematic three dimensional outline which is useful in explaining the theoretical considerations in the design of the test fixture 10. Referring briefly to FIGURE 3, a test component 22, in dash outline, is shown mounted to the vertical mounting surface 14. The ".0" designates the center of gravity of the component 22. The geometrical center of the surface of the base 12 has been designated CP for reasons that will become clear hereinafter, and the center of gravity of the test fixture is assumed to be located behind the vertical mounting surface 14; it is designated CG.

Referring now to FIGURE 4 of the drawings the test fixture 10 is shown in phantom superimposed on a three dimensional coordinate system X, Y and Z. The lower surface of cylindrical base 12 lies in the X—Y plane and the height of test fixture 10 rises in the Z direction. The vertical mounting surface 14 is constructed so that it is parallel to the Y—Z plane and symmetrical with respect to the Z and X axes. The geometrical center CP of the cylindrical base portion 12 is located at the origin of the coordinate system. As shown in FIGURE 4 the center of gravity CG is displaced from the geometrical center and is located in the X—Z plane above and to the left of the origin. The irregular bordered area 23 represents a top surface of an environmental test equipment. It also lies in the X—Y plane and accordingly, the lower surface of the cylindrical base 12 overlies and abuts this surface 23.

Generally, a surface on which distributed forces are applied includes a point about which the moments of the applied forces equal zero. This point is commonly called the center of pressure. Where the forces are uniformly distributed and where the surface is a circle, as in the case of the test fixture 10, the center of pressure acts on the geometric center of the surface.

As a practical matter, the environmental test equipment applies uniformly distributed forces on an object secured to its surface. The small arrows distributed across the surface 23, in FIGURE 4, represent these uniformly distributed forces acting vertically, parallel to the Z axis. Where a uniform distribution is assumed, it is immaterial where the test fixture is secured on the surface of the test equipment. The sum of the applied moments about the base surface center of gravity of the test fixture, in this case CP, will equal zero. However, if the applied forces developed by the test equipment are not uniformly distributed, the center of pressure of the forces applied by the test equipment, the point on its surface where the sum of the developed moments equal zero, must first be located. When the test fixture is secured to the test equipment, care must be taken to locate the base surface center of gravity, CP of the test fixture over the center of pressure, also CP, of the test equipment.

In FIGURE 4, the force "F" denoted by the large arrow represents a single force whose magnitude equals the sum of the uniformly distributed forces acting on the base of the test fixture 10. It will be noted that the force "F" is applied at the base surface center of gravity CP of the test fixture. Also, FIGURE 4 does not include a component mounted on the vertical mounting surfaces 13 and 14. Theoretically, if the unloaded fixture were to be subjected to an environmental condition, such as a vibration force, the moment generated by the force "F" around the center of gravity would tend to cause the mounting surface 14 to bend in a counterclockwise direction. If the applied force were sinusoidal, as is often the case, the vertical mounting surface 14 would tend to vibrate sinusoidally. However, the novel construction features of the test fixture 10 whereby the mounting surface 14 is braced in front and in back, creates a very rigid or stiff fixture. Accordingly, there is some latitude in displacing the center of gravity from the Z axis before the moments developed about the center of gravity CG become noticeable and undesirable. For a test fixture having the aforementioned parameters, the center of gravity CG is displaced from the geometric center CP of the test by ⅝ inch. Magnesium fixtures show no tendency to amplify the applied vibrational condition in the frequency range from 20 to 1800 c.p.s. A 2 to 1 amplification is obtained at 3000 c.p.s. with a peak amplification of 40 at 4500 c.p.s.

Referring to FIGURE 3, it will be noted that the vertical mounting surface lies between the center of pressure CP and the center of gravity CG. The center of gravity "0" of the test component lies in the X—Z plane, denoted by a line X, Z joining the center of gravity CG of the test fixture 10 and its center of pressure CP. However, "0" is located to the right of the center of pressure CP, Manifestly, the center of gravity of the combination of test fixture 10 and test component 22, designated "C," lies to the right of the center of gravity CG of the test fixture. Just how far to the right the combined center of gravity C will lie, depends on the nature of the test component, its mass and the location of its center of gravity "0." Ideally, if the moments are to be avoided the combined center of gravity should lie on the Z axis directly over the center of pressure CP. This condition can be achieved for a specific type of mass, but generally it is desirable to work with a reasonable range of test component configurations. This is readily accomplished by permitting the combined center of gravity to vary over a reasonable range with respect to the center of pressure CP. Tests have shown that any component may be satisfactorily tested on the test fixture 10 provided the combined center of gravity C is no further to the right of the center of pressure CP than the center of gravity CG lies to the left of the center of pressure CP.

For the test fixture described test components weighing up to six pounds have been satisfactorily vibrated to 2000 c.p.s. without observing any adverse effect that can be attributed to excessive moments on the vertical mounting surface. For example, the magnesium fixture discussed above exhibited no amplification with a three pound mass in the frequency range of 20 to 1400 c.p.s. and the amplification increased to 2 at 2200 c.p.s. Substantially the same fine results were observed for test components up to six pounds. It follows that test components that create a combined center of gravity outside the preferred region can be accommodated at lower frequencies.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A test fixture for transferring an environmental force applied to it by an environmental test equipment to a test component secured to the test fixture, said environmental force having a center of pressure, said test fixture comprising a body having a base surface on which the environment force is applied including a center of gravity of the base surface to coincide with the center of pressure, a test fixture center of gravity spaced from the base surface center of gravity laterally from the direction of the applied environmental force, and mounting means for securing the test component to the test fixture between the test fixture center of gravity and a line through the base surface center of gravity in the direction of the applied environmental force.

2. A test fixture for transferring an environmental force applied to it by an environmental test equipment to a test component secured to the fixture, said environmental force having a center of pressure, said test fixture comprising a body having a base surface on which the environmental force is applied including a center of gravity of the base surface to coincide with the center of pressure, a test fixture center of gravity spaced from the base surface center of gravity laterally from the direction of the applied environmental force, the test fixture center of gravity and a line through the base surface center of gravity extending in the direction of the applied environmental force defining a plane, and mounting surfaces perpendicular and symmetrical to the aforementioned plane, said test fixture also including means for releasably securing the test component to a mounting surface, said securing means being positioned with relation to the test fixture center of gravity and the base surface center of gravity for positioning the center of gravity of the test component in the aforementioned plane and on the side of the base surface center of gravity opposite that in which the test fixture center of gravity is located.

3. A test fixture as described in claim 2 in which said securing means comprises threaded means for releasably securing the test component to the mounting surfaces and said mounting surfaces comprising a first mounting surface parallel to the direction of the applied force and a second mounting surface transverse to the first mounting surface.

4. A test fixture for transferring an environmental force applied to it by an environmental test equipment to a test component secured to the test fixture, the environmental force having a center of pressure, said test fixture comprising: a unitary body having a test fixture center of gravity, a base for receiving the applied environmental force including a base surface center of gravity to coincide with the center of pressure, the base surface center of gravity being spaced from the test fixture center of gravity laterally from the direction of the applied environmental force, said test fixture also including mounting surfaces defining a recess, and means for securing the test component to the mounting surfaces, one of said mounting surfaces being parallel to the direction of the environmental force and positioned on the base surface center of gravity side of the test fixture center of gravity.

5. A test fixture as described in claim 4 in which the unitary body includes a cylindrical base portion having a frusto-conical portion extending from the base portion.

6. A test fixture as described in claim 5 in which the recess is defined by a horizontal mounting surface in the plane forming the junction of the cylindrical base portion and the frusto-conical portion and a vertical mounting surface extending from the horizontal mounting surface between the center of gravity and the base surface center of gravity.

References Cited in the file of this patent
UNITED STATES PATENTS

| | | |
|---|---|---|
| 2,228,449 | Allendorff | Jan. 14, 1941 |
| 2,703,490 | Brueggeman et al. | Mar. 8, 1955 |